(12) United States Patent
Perley et al.

(10) Patent No.: US 11,098,698 B2
(45) Date of Patent: Aug. 24, 2021

(54) SYSTEM AND METHOD FOR AUTO-CALIBRATING A LOAD SENSOR SYSTEM OF A WIND TURBINE

(71) Applicant: General Electric Company, Schenectady, NY (US)

(72) Inventors: Thomas Franklin Perley, Simpsonville, SC (US); Katherine Derksen Stinson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 15/092,772

(22) Filed: Apr. 7, 2016

(65) Prior Publication Data

US 2017/0292501 A1  Oct. 12, 2017

(51) Int. Cl.
*F03D 17/00*  (2016.01)
*F03D 9/25*  (2016.01)

(52) U.S. Cl.
CPC ............ *F03D 17/00* (2016.05); *F03D 9/25* (2016.05); *F05B 2220/30* (2013.01); *F05B 2270/802* (2013.01); *F05B 2270/808* (2013.01)

(58) Field of Classification Search
CPC ...... F03D 17/00; F03D 9/25; F05B 2270/808; F05B 2270/802; F05B 2220/30
See application file for complete search history.

(56) References Cited

U.S. PATENT DOCUMENTS

| | | | |
|---|---|---|---|
| 6,320,272 B1* | 11/2001 | Lading | F03D 17/00 290/44 |
| 6,940,186 B2* | 9/2005 | Weitkamp | F03D 7/042 290/44 |
| 8,105,029 B2 | 1/2012 | Egedal et al. | |
| 8,157,522 B2 | 4/2012 | Bolz | |
| 8,255,173 B2 | 8/2012 | Fujioka et al. | |
| 8,360,722 B2 | 1/2013 | Hoffmann et al. | |
| 8,702,388 B2 | 4/2014 | Garate Álvaro et al. | |
| 9,018,788 B2 | 4/2015 | Bertolotti et al. | |
| 2011/0135474 A1 | 6/2011 | Thulke et al. | |
| 2011/0145277 A1* | 6/2011 | Gadre | F03D 17/00 707/769 |
| 2012/0035865 A1* | 2/2012 | Fujioka | F03D 17/00 702/42 |

(Continued)

FOREIGN PATENT DOCUMENTS

AU  2009340218 A1  11/2010

*Primary Examiner* — Vongsavanh Sengdara
(74) *Attorney, Agent, or Firm* — Dority & Manning, P.A.

(57) ABSTRACT

The present disclosure is directed to systems and methods for automatically calibrating a load sensor system of a wind turbine and determining health of same. In one embodiment, the method includes receiving a plurality of sensor signals generated by the plurality of load sensors from the load sensor system. The method also includes determining, via a computer model, a load estimation of the wind turbine based on the sensor signals, turbine geometry, and one or more additional input parameters (e.g. rotor azimuth angle, pitch angle, rotor position, etc.). Another step includes comparing the load estimation to a load measurement to determine one or more correlation coefficients. Thus, the method also includes calibrating the plurality of sensors in the load sensor system based on the correlation coefficients.

19 Claims, 8 Drawing Sheets

(56) References Cited

U.S. PATENT DOCUMENTS

| | | | |
|---|---|---|---|
| 2012/0292905 A1* | 11/2012 | Slot | F03D 17/00 290/44 |
| 2013/0099497 A1* | 4/2013 | Bowyer | F03D 7/042 290/44 |
| 2013/0183151 A1* | 7/2013 | Garate Lvaro | F03D 17/00 416/1 |
| 2013/0298634 A1 | 11/2013 | Eden | |
| 2014/0377064 A1* | 12/2014 | Kristoffersen | F03D 7/0224 416/1 |
| 2015/0322925 A1* | 11/2015 | Klitgaard | F03D 7/022 416/1 |
| 2015/0337806 A1* | 11/2015 | Damgaard | F03D 1/00 700/287 |
| 2016/0195069 A1* | 7/2016 | Plano Morillo | F03D 7/043 416/61 |

* cited by examiner

SYSTEM AND METHOD FOR AUTO-CALIBRATING A LOAD SENSOR SYSTEM OF A WIND TURBINE

FIELD OF THE INVENTION

The present subject matter relates generally to wind turbines and, more particularly, to systems and methods for automatically calibrating a load sensor system of a wind turbine.

BACKGROUND OF THE INVENTION

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

The amount of power that may be produced by a wind turbine is typically limited by structural limitations of the individual wind turbine components. Thus, it is imperative to wind turbine operation to ensure loads acting on the turbine do not exceed design limits. As such, many wind turbines employ a load sensor system having a plurality of sensors configured to measure the loads acting on the various wind turbine components. Such sensor systems need to be calibrated upon installation and at subsequent times thereafter to ensure accurate information is provided for the load estimation. Further, as more sensors are being used on the wind turbine, a robust calibration system is needed to validate loads at various locations.

Conventional calibration methods, however, are not automatic and require accurately installed gages that are pre-bridged and hardwired together. In view of the foregoing, the art is continuously seeking new and improved systems and methods for calibrating load sensor systems for wind turbines. More specifically, a system and method for calibrating a load sensor system for a wind turbine that also verifies the health/validity of the sensors within the sensor system as well as independent sensors would be desired in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a computer-implemented method for automatically calibrating a load sensor system of a wind turbine. As is generally understood in the art, the load sensor system includes a plurality of load sensors. Thus, the method includes receiving, via a controller, a plurality of sensor signals generated by the plurality of load sensors from the load sensor system. The method also includes determining, via a computer model stored in the controller, a load estimation of the wind turbine based on the sensor signals, turbine geometry, and one or more additional input parameters. Another step includes comparing, via the controller, the load estimation to a load measurement to determine one or more correlation coefficients. Further, the method includes calibrating the plurality of sensors in the load sensor system based on the correlation coefficients.

In one embodiment, the method includes automatically checking the one or more correlation coefficients upon installation and at one or more scheduled intervals, such as during turbine diagnostics, battery testing, etc.

In another embodiment, the method may include determining a sensor location of each of the plurality of sensors and providing the sensor locations or coordinates to the computer model of the controller. In such embodiments, the method may also include determining the load estimation of the wind turbine based on turbine geometry, the one or more input parameters, and/or the sensor locations.

In additional embodiments, the method may include determining a sensor orientation of each of the plurality of sensors and providing the sensor orientations to the computer model of the controller. Thus, in such embodiments, the method may include determining the load estimation of the wind turbine based on turbine geometry, the one or more input parameters, the sensor locations, and/or the sensor orientations.

In further embodiments, the input parameter(s) may include a rotor azimuth angle, a pitch angle, rotor position, a yaw angle, turbine materials information, and/or any other suitable input parameters. In yet another embodiment, the correlation coefficient(s) may include an initial gain, an offset, and/or a $R^2$ value. In particular embodiments, the plurality of sensors may include strain gauges, proximity probes, tower top accelerometers, or pitch card accelerometers.

In another aspect, the present disclosure is directed to a system for automatically calibrating a load sensor system of a wind turbine. The system includes a controller having at least one processor configured to perform one or more operations. More specifically, the one or more operations may include receiving a plurality of sensor signals generated by the plurality of load sensors from the load sensor system, determining, via a computer model stored in the controller, a load estimation of the wind turbine based on the sensor signals, turbine geometry, and one or more additional input parameters, comparing the load estimation to a load measurement to determine one or more correlation coefficients, and calibrating the plurality of sensors in the load sensor system based on the correlation coefficients.

In yet another aspect, the present disclosure is directed to a method for determining health of a load sensor system of a wind turbine. The method includes receiving, via a controller, a plurality of sensor signals generated by the plurality of load sensors from the load sensor system. The method also includes determining, via a computer model stored in the controller, a load estimation of the wind turbine based on the sensor signals, turbine geometry, and one or more additional input parameters. Another step includes comparing, via the controller, the load estimation to a load measurement to determine one or more correlation coefficients. Thus, the method further includes determining, via the controller, an overall health of one or more of the sensors in the load sensor system based on the one or more correlation coefficients over time. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
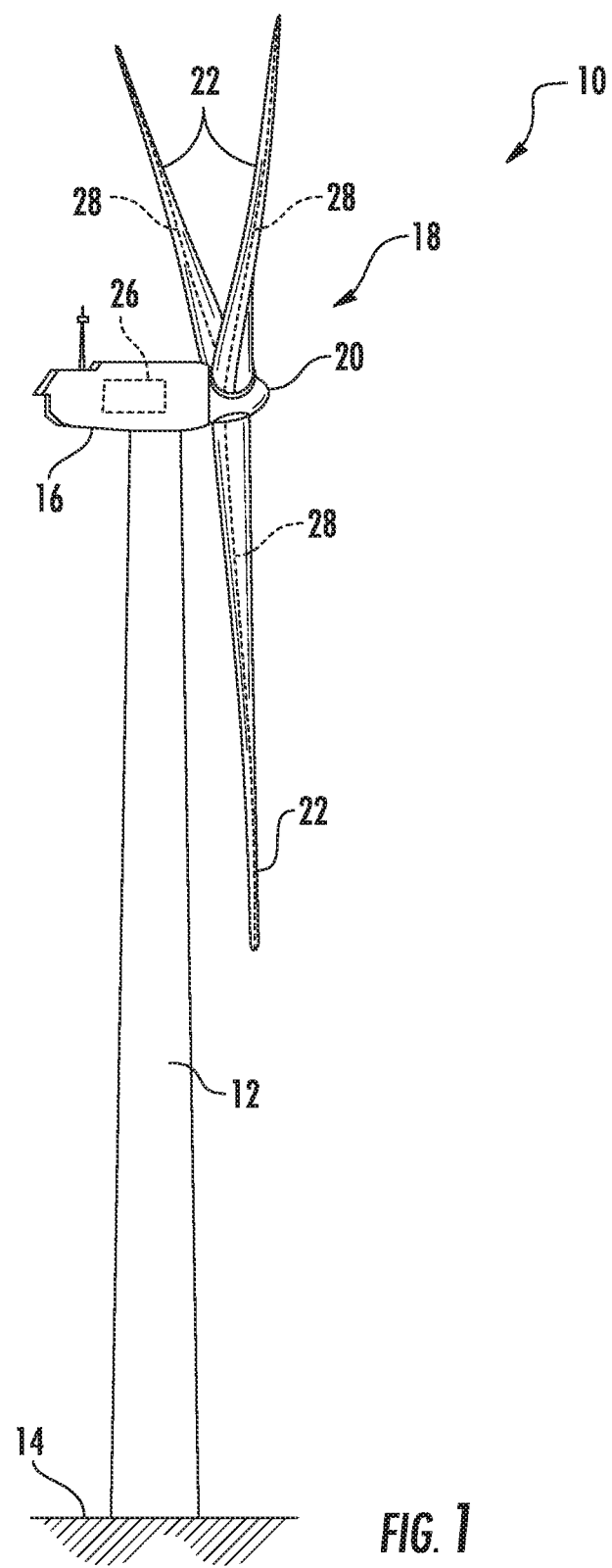
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for automatically calibrating a load sensor system of a wind turbine and determining health of same. For example, in one embodiment, the method includes receiving sensor signals from the load sensors and determining, via a computer model, a load estimation of the wind turbine based on the sensor signals, turbine geometry, and one or more additional input parameters (e.g. rotor azimuth angle, pitch angle, rotor position, etc.). The method then includes comparing the load estimation to a load measurement to determine one or more correlation coefficients. Thus, the method also includes calibrating the plurality of sensors in the load sensor system based on the correlation coefficients.

The various embodiments of the present disclosure described herein provide numerous advantages not present in the prior art. For example, the present disclosure provides more precision on sensor location using raw measurements and control channels. Thus, the present disclosure requires less rigor and accuracy needed in initial sensor placement. In addition, the present disclosure is configured to diagnose and confirm the load sensor system health over the life of the sensors. Moreover, the present disclosure may be implemented using existing components of the wind turbine and does not require additional hardware. As such, a user is not required to purchase, install, and maintain new equipment. Further, the present disclosure may be integrated with a broader control system, such as, but not limiting of, a wind turbine control system, a plant control system, a remote monitoring system, or combinations thereof.

Referring now to FIG. 1, a perspective view of one embodiment of a wind turbine 10 according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. In addition, as shown in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine signals. Accordingly, the controller 26 may generally be configured to control the various operating modes of the wind turbine 10 (e.g., start-up or shut-down sequences) and/or control various components of the wind turbine 10 as will be discussed in more detail below.

Figure 2:
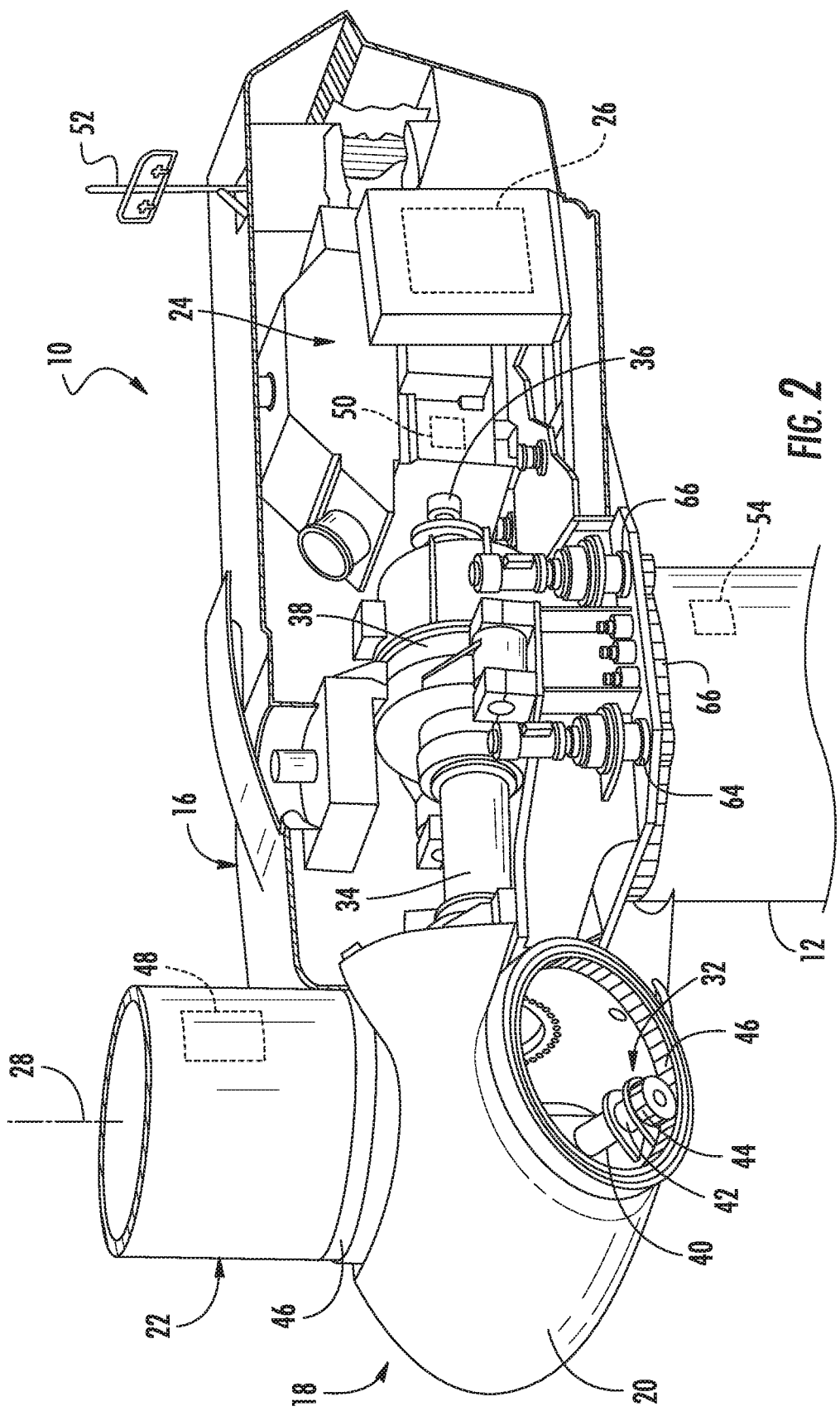
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 64 communicatively coupled to the controller 26, with each yaw drive mechanism(s) 64 being configured to change the angle of the nacelle 16 relative to the wind (e.g., by engaging a yaw bearing 66 of the wind turbine 10).

Still referring to FIG. 2, the wind turbine 10 may also include one or more sensors 48, 50, 52, 54 for measuring various operating parameters and/or generated various load sensor signals. The sensors 48, 50, 52, 54 may be part of a load sensor system 70 (FIG. 5) or may be separate, independent sensors. For example, in various embodiments, the load sensory system 70 may include a plurality of strain gauges, whereas the independent sensors may include proximity probes and/or accelerometers. More specifically, in certain embodiments, the sensors may include blade sensors 48 for measuring a pitch angle of one of the rotor blades 22 or for measuring a load acting on one of the rotor blades 22; generator sensors 50 for monitoring the generator 24 (e.g. torque, rotational speed, loading, acceleration and/or the power output); tower sensors 54 for tower bending and/or acceleration in the tower 12; and/or various wind sensors 52 for measuring various wind parameters, such as wind speed, wind peaks, wind turbulence, wind shear, changes in wind direction, air density, or similar. Further, the sensors 48, 50, 52, 54 may be located near the ground of the wind turbine, on the nacelle 16 of the wind turbine 10, or on a meteorological mast of the wind turbine 10.

It should also be understood that any other number or type of sensors may be employed and at any location. For example, in certain embodiments, the sensors of the present disclosure may include fiber optic strain gauges. In further embodiments, the sensors described herein may include Micro Inertial Measurement Units (MIMUs), strain gauges, accelerometers (e.g. tower top accelerometers or pitch card accelerometers), pressure sensors, angle of attack sensors, vibration sensors, proximity probes or sensors, Light Detecting and Ranging (LIDAR) sensors, fiber optic systems, anemometers, wind vanes, Sonic Detection and Ranging (SODAR) sensors, infra lasers, radiometers, pitot tubes, rawinsondes, and/or any other suitable sensors. Further, it should be appreciated that, as used herein, the term "monitor" and variations thereof indicates that the various sensors may be configured to provide a direct measurement of the parameters being monitored or an indirect measurement of such parameters. Thus, the sensors 48, 50, 52, 54 may, for example, be used to generate sensor signals relating to the parameter being monitored, which can then be utilized by the controller 26 to determine the actual parameter.

Figure 3:
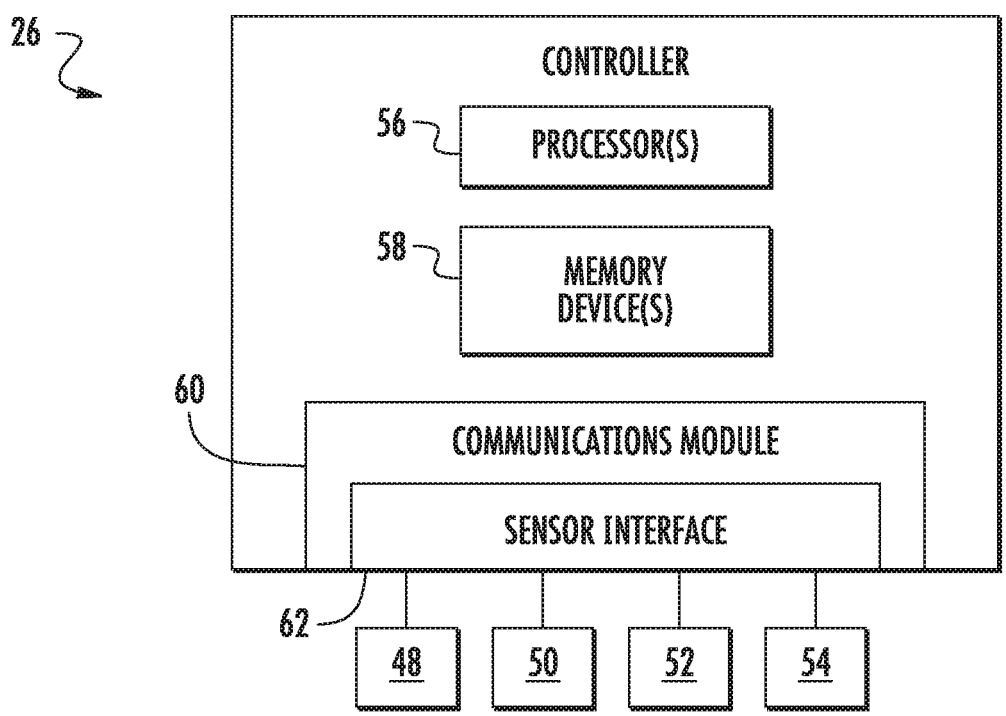
FIG. 3 illustrates a schematic diagram of one embodiment of a controller of a wind turbine according to the present disclosure.

Referring now to FIG. 3, there is illustrated a block diagram of one embodiment of various components of the controller 26 according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from the sensors 48, 50, 52, 54 to be converted into signals that can be understood and processed by the processor(s) 56. It should be appreciated that the sensors 48, 50, 52, 54 may be communicatively coupled to the communications module 60 using any suitable means. For example, as shown, the sensors 48, 50, 52, 54 are coupled to the sensor interface 62 via a wired connection. However, in other embodiments, the sensors 48, 50, 52, 54 may be coupled to the sensor interface 62 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 56, configure the controller 26 to perform various functions including, but not limited to, storing one or more predefined deformation margins for the rotor blades, transmitting suitable control signals to implement control actions to reduce loads acting on the wind turbine, and/or various other suitable computer-implemented functions.

Figure 4:
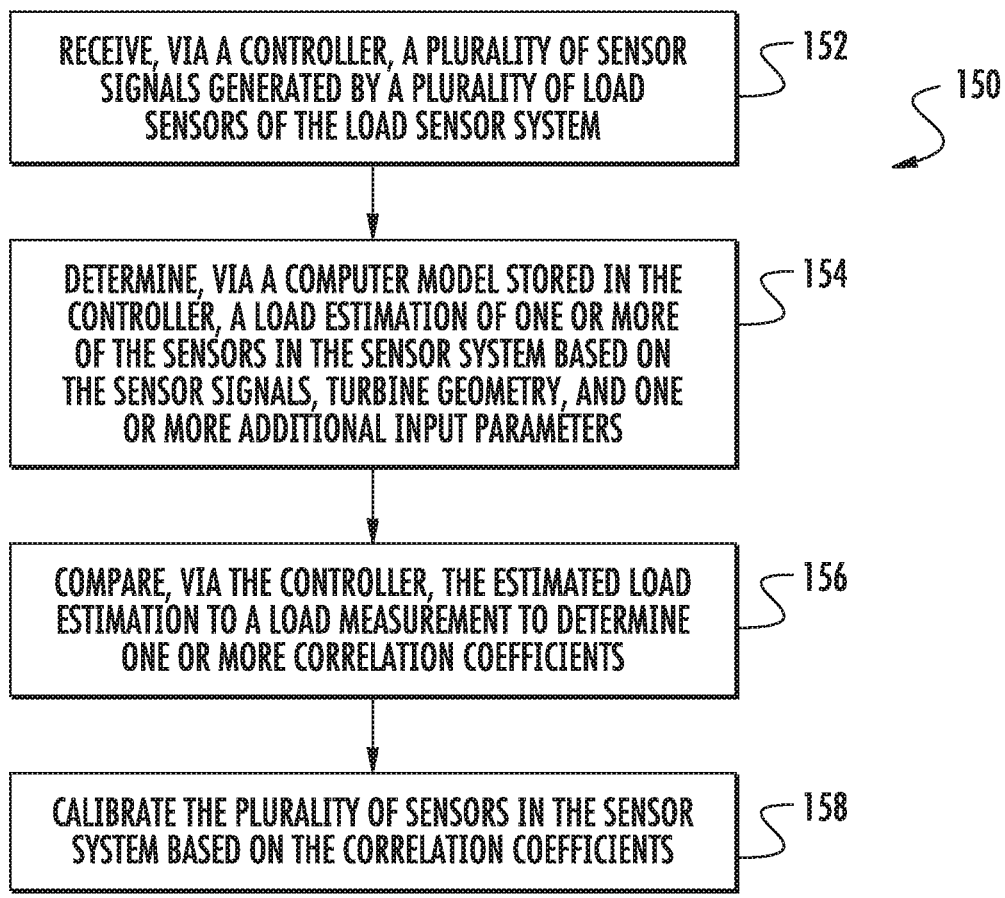
FIG. 4 illustrates a flow diagram of one embodiment of a method for calibrating a load sensor system of a wind turbine according to the present disclosure.
Figure 5:
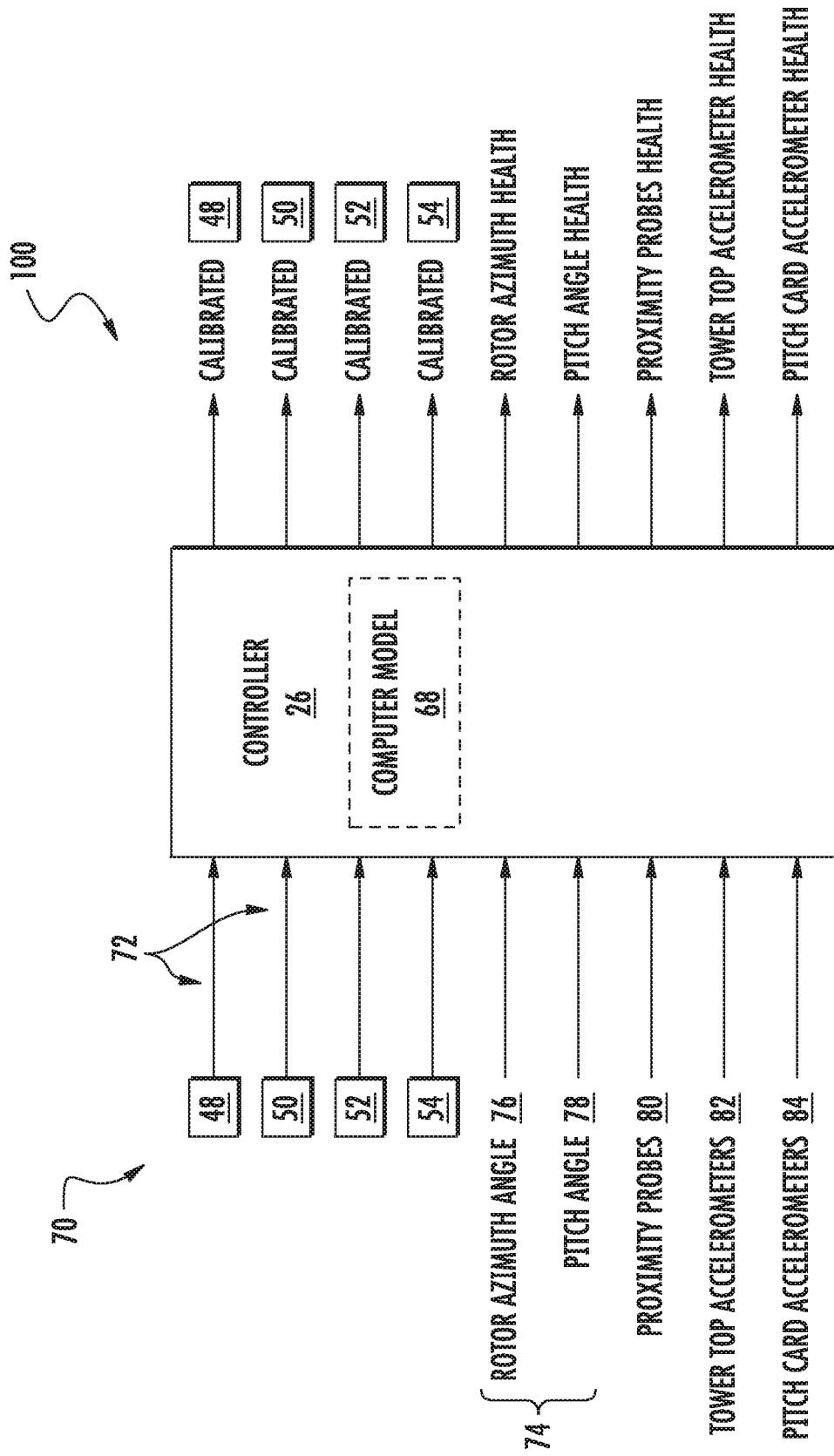
FIG. 5 illustrates a schematic diagram of one embodiment of a system for calibrating a load sensor system of a wind turbine according to the present disclosure.

Referring now to FIGS. 4 and 5, a system 100 and method 150 for automatically calibrating a load sensor system 70 of a wind turbine 10 according to the present disclosure is illustrated. As shown at 152 of FIG. 4, the method 150 includes receiving, via the controller 26, a plurality of sensor signals 72 generated by the plurality of load sensors from the load sensor system 70. For example, in one embodiment, the sensors 48, 50, 52, 54 may include fiber optic strain gauges.

As shown at 154, the method 150 may further include determining, via a computer model 68 stored in the controller 26, a load estimation of the wind turbine 10 (or components thereof) based on the sensor signals 72, turbine geometry, and one or more additional input parameters 74. Thus, the load estimation may represent a load acting on any of the wind turbine components, including but not limited to the rotor blades 22, the tower 12, the nacelle 16, the rotor 18, the shafts 34, 36, and/or any other suitable wind turbine component. Further, the computer model 68 may include any number of suitable algorithms and/or programmed equations configured to calculate the load estimation of the wind turbine 10 via the sensors 48, 50, 52, 54. Thus, by using simple calculations, known geometry, material information, and applying appropriate coordinate systems, the controller 26 is configured to determine a given load at any point in the rotor plane. This auto-calibration procedure allows for a more robust calibration that does not rely on accurately installed sensors.

In another embodiment, the method 150 may include determining a sensor location of each of the plurality of sensors 48, 50, 52, 54 and providing the sensor locations to the computer model 68 of the controller 26. In such embodiments, the method 150 may include determining the load estimation of the wind turbine 10 based on the sensor signals 72, turbine geometry, the one or more input parameters 74, and/or the sensor locations. In additional embodiments, the method 150 may include determining a sensor orientation (e.g. coordinates in a rotor plane) of each of the plurality of sensors 48, 50, 52, 54 and providing the sensor orientations to the computer model 68 of the controller 26. Thus, in such embodiments, the method 150 may include determining the load estimation of the wind turbine 10 based on the sensor signals 72, turbine geometry, the one or more input parameters 74, the sensor locations, and/or the sensor orientations.

In addition, as shown FIG. 5, in certain embodiments, the input parameter(s) 74 may include a rotor azimuth angle 76, a pitch angle 78 of the wind turbine 10, or a rotor position of the rotor 18. In additional embodiments, the input parameter(s) 74 may include a yaw angle, turbine materials information, and/or any other suitable input parameters used by the computer model 68.

Figure 6:
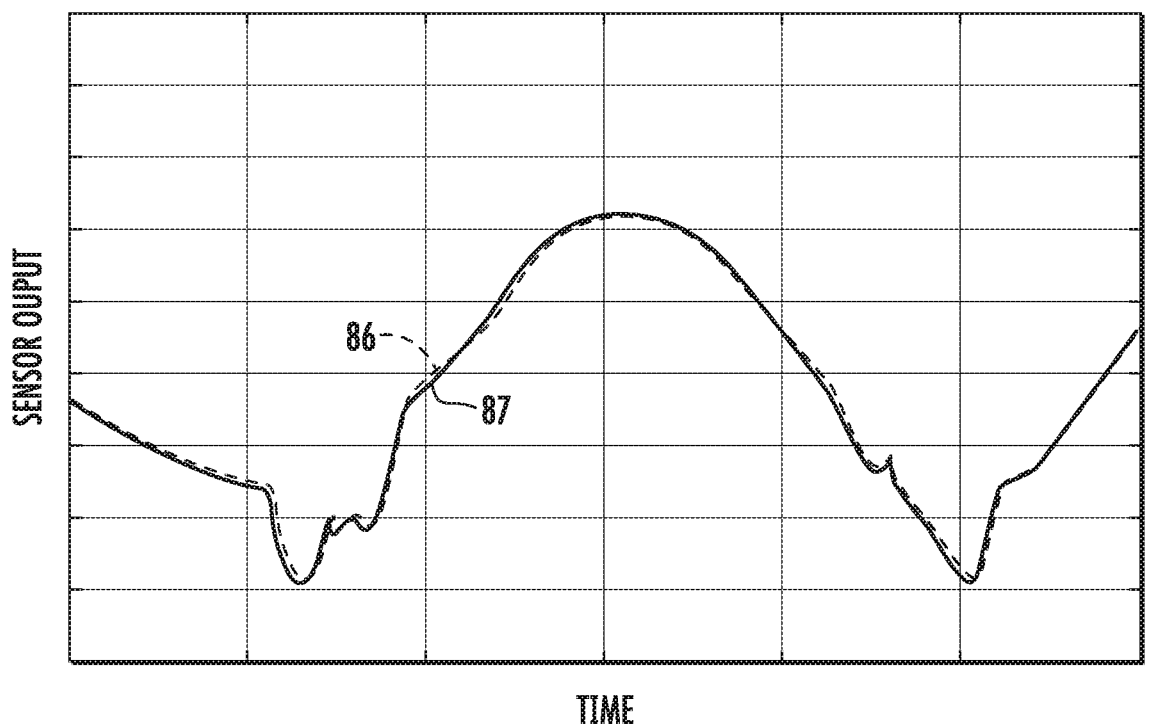
FIG. 6 illustrates a graph of one embodiment of time (x-axis) versus sensor output (y-axis) illustrating a comparison of a raw measurement signal and an automatically-calibrated signal according to the present disclosure, particularly illustrating a load sensor system having good sensor health.

Referring back to FIG. 4, as shown at 156, the method 150 also includes comparing, via the controller 26, the load estimation to a load measurement to determine one or more correlation coefficients. For example, as shown in FIG. 6, a graph of one embodiment of time (x-axis) versus sensor output (y-axis) is illustrated depicting such a comparison, where curve 86 represents the raw measurement signal and curve 87 represents the automatically-calibrated signal. Thus, as shown, the controller 26 is configured to monitor the correlation coefficient(s) over time such that the controller 26 can recognize when the sensors are faulty or damaged. The automatically-calibrated signal 87 of FIG. 6 particularly illustrates a well-calibrated signal which is indicative of good sensor health.

In certain embodiments, the correlation coefficient(s) may include an initial gain, an offset, and/or a $R^2$ value and how such quantities drift or change over time. In addition, in certain embodiments, the method 150 may include automatically checking the correlation coefficient(s) upon installation and/or at one or more scheduled intervals, such as during turbine diagnostics, battery testing, etc. Thus, as shown at 158, the method 150 includes calibrating the plurality of sensors 48, 50, 52, 54 in the load sensor system 70 based on the correlation coefficients.

Figure 7:
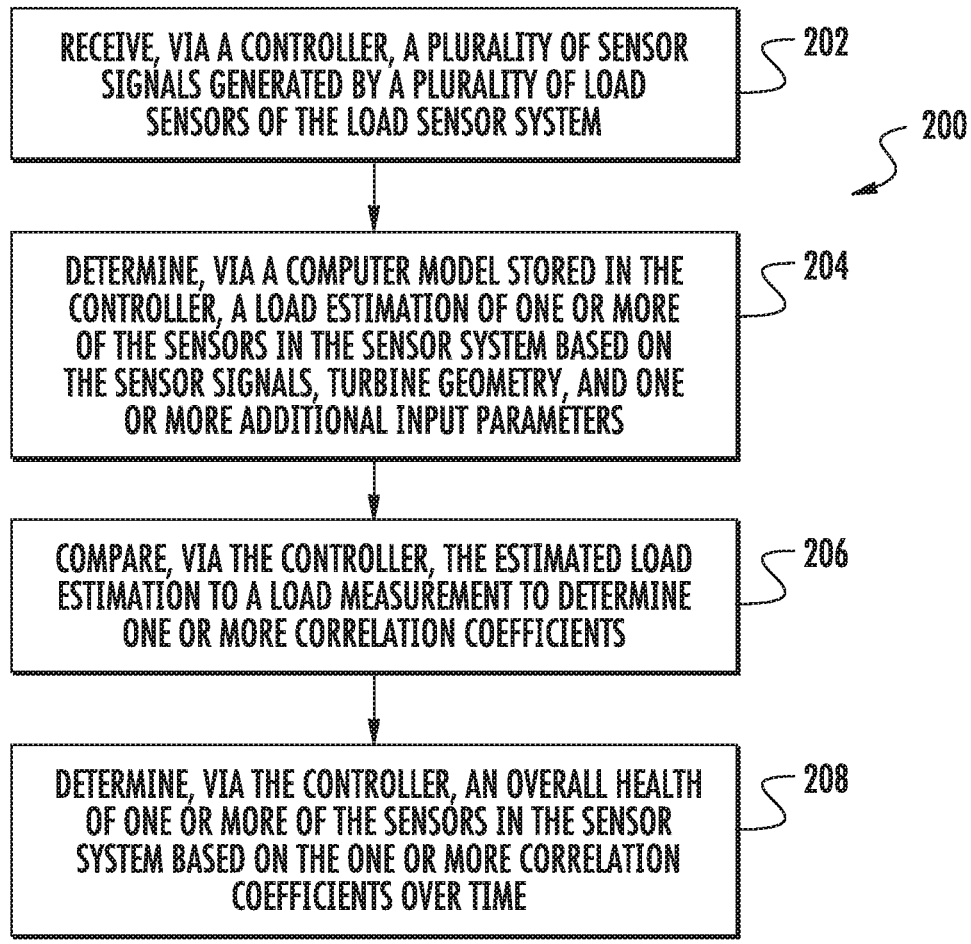
FIG. 7 illustrates a flow diagram of one embodiment of a method for determining health of a load sensor system of a wind turbine according to the present disclosure.

Referring now to FIG. 7, a flow diagram of one embodiment of a method 200 for determining health of a load sensor system 70 of a wind turbine 10 according to the present disclosure is illustrated. As shown at 202, the method 200 includes receiving, via the controller 26, a plurality of sensor signals 72 generated by the load sensors of the load sensor system 70. As shown at 204, the method 200 includes determining, via a computer model 68 stored in the controller 26, a load estimation of the wind turbine 10 based on the sensor signals 72, turbine geometry, and one or more additional input parameters 74. As shown at 206, the method 200 includes comparing, via the controller 26, the load estimation to a load measurement to determine one or more correlation coefficients. As shown at 208, the method 200 includes determining, via the controller 26, an overall health of one or more of the sensors 48, 50, 52, 54 in the load sensor system 70 based on the one or more correlation coefficients over time.

Figure 8:
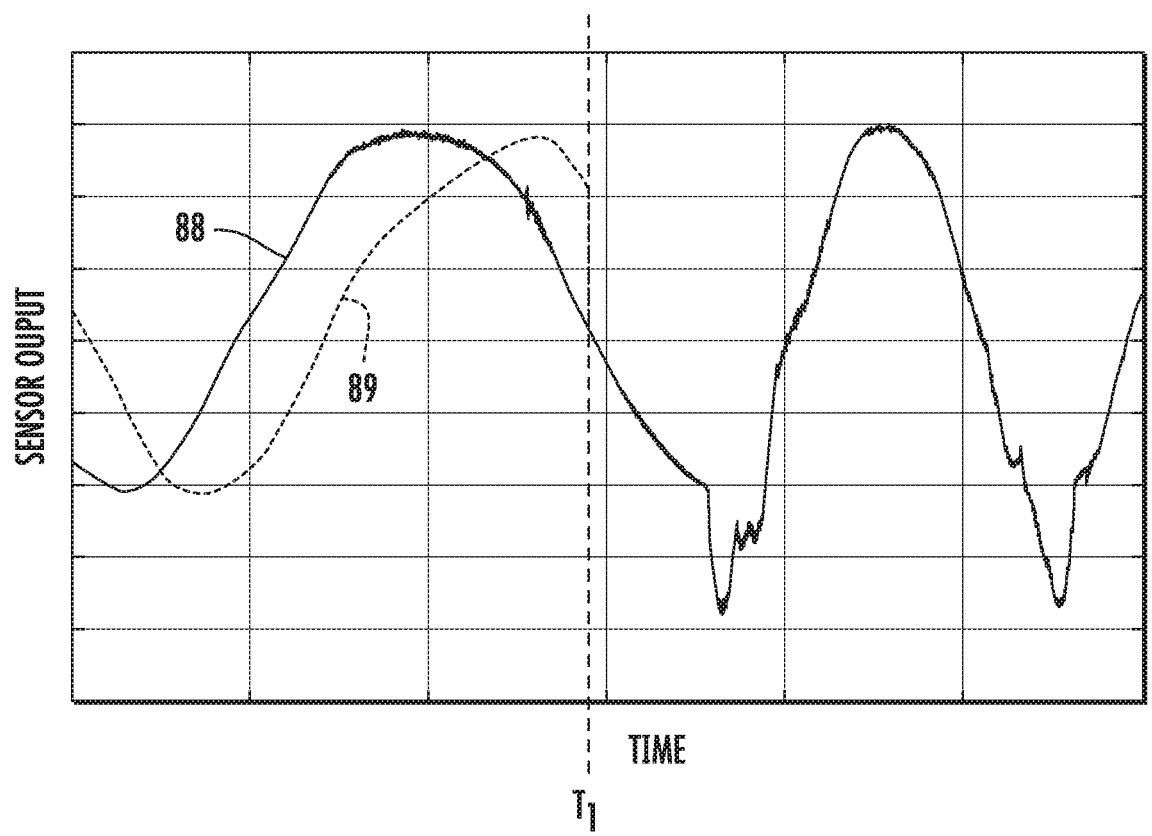
FIG. 8 illustrates a graph of one embodiment of time (x-axis) versus sensor output (y-axis) illustrating a comparison of a raw measurement signal and an automatically-calibrated signal according to the present disclosure, particularly illustrating a load sensor system having poor sensor health.

More specifically, referring back to FIG. 5, the controller 26 is configured to receive sensor signals from various strain gauges as well as independent sensors proximity probes 80, tower top accelerometers 82 and pitch card accelerometers 84. Thus, as shown, the controller 26 is configured to determine the overall health of the load sensors of the load sensor system 70, as well as the independent sensors using the computer model 68 as the correlation coefficients are proxies for sensor health. Referring now to FIG. 8, a graph of one embodiment of time (x-axis) versus sensor output (y-axis) for the rotor azimuth angle is illustrated. More specifically, as shown, the graph illustrates the raw azimuth signal 88 and the automatically-calibrated azimuth signal 89 which depicts a low $R^2$ correlation at time $T_1$. As such, the graph indicates poor azimuth angle health.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for automatically calibrating a load sensor system of a wind turbine, the method comprising:

upon installing the wind turbine at a wind turbine site, installing a plurality of load sensors of the load sensor system at a plurality of sensor locations in or on the wind turbine, the plurality of sensor locations comprising at least one rotor blade of the wind turbine, a tower of the wind turbine, and a generator of the wind turbine;

receiving, via a controller of the wind turbine, a plurality of sensor signals generated by the plurality of installed load sensors from the load sensor system;

using a rotor azimuth angle, a pitch angle, a rotor position, the plurality of sensor signals, and turbine geometry in a computer model stored in the controller to determine a loading of the wind turbine;

comparing, via the controller, the estimated loading to a measured loading to determine at least one correlation coefficient, the at least one correlation coefficient being a proxy for operability of the plurality of installed load sensors;

automatically calibrating the plurality of installed load sensors in the load sensor system based on the at least one correlation coefficient;

monitoring loads of the wind turbine with the plurality of calibrated load sensors; and implementing, via the controller, a control action when the monitored loads exceed a predetermined threshold so as to reduce the loads of the wind turbine during operation of the wind turbine, the control action comprising at least one of adjusting a parameter of one or more components of the wind turbine or shutting down the wind turbine.

2. The method of claim 1, further comprising automatically checking the at least one correlation coefficient upon installation of the plurality of calibrated load sensors at a scheduled interval of time.

3. The method of claim 1, further comprising providing the plurality of sensor locations to the computer model of the controller.

4. The method of claim 3, further comprising determining the estimated loading of the wind turbine based on the plurality of sensor signals, the turbine geometry, the plurality of additional input parameters, and the plurality of sensor locations.

5. The method of claim 4, further comprising determining a sensor orientation of each of the plurality of installed load sensors and providing the sensor orientations to the computer model of the controller.

6. The method of claim 5, further comprising determining the estimated loading of the wind turbine based on the plurality of sensor signals, the turbine geometry, the plurality of additional input parameters, the plurality of sensor locations, and the sensor orientations.

7. The method of claim 1, wherein the at least one correlation coefficient comprises at least one of an initial gain, an offset, or an R2 value.

8. The method of claim 1, wherein the plurality of installed load sensors further comprise at least one of strain gauges, proximity probes, tower top accelerometers, or pitch card accelerometers.

9. The method of claim 1, wherein the plurality of additional input parameters further comprise at least one of a yaw angle or turbine materials information.

10. A system for automatically calibrating a load sensor system of a wind turbine, the system comprising:
a plurality of load sensors installed at a plurality of sensor locations in or on the wind turbine, the plurality of sensor locations comprising at least one rotor blade of the wind turbine, a tower of the wind turbine, and a generator of the wind turbine;
a controller comprising a processor configured to perform one or more operations, the one or more operations comprising:
receiving a plurality of sensor signals generated by the plurality of installed load sensors of the load sensor system;
using a rotor azimuth angle, a pitch angle, a rotor position, the plurality of sensor signals, and turbine geometry in a computer model stored in the controller to determine a loading of the wind turbine;
comparing the estimated loading to a measured loading to determine at least one correlation coefficient, the at least one correlation coefficient being a proxy for operability of the plurality of load sensors;
automatically calibrating the plurality of sensors in the load sensor system based on the at least one correlation coefficient;
monitoring loads of the wind turbine with the plurality of calibrated load sensors; and
implementing, via the controller, a control action when the monitored loads exceed a predetermined threshold so as to reduce the loads of the wind turbine during operation of the wind turbine, the control action comprising at least one of adjusting a parameter of one or more components of the wind turbine or shutting down the wind turbine.

11. A method for evaluating operability of a load sensor system of a wind turbine, the load sensor system having a plurality of load sensors, the method comprising:
upon installing the wind turbine at a wind turbine site, installing a plurality of load sensors of the load sensor system at a plurality of sensor locations in or on the wind turbine, the plurality of sensor locations comprising at least one rotor blade of the wind turbine, a tower of the wind turbine, and a generator of the wind turbine;
receiving, via a controller, a plurality of sensor signals generated by the plurality of installed load sensors of the load sensor system;
using a rotor azimuth angle, a pitch angle, a rotor position, the plurality of sensor signals, and turbine geometry in a computer model stored in the controller to determine a loading of the wind turbine;
comparing, via the controller, the estimated load to measured loading to determine at least one correlation coefficient; and,
determining, via the controller, the operability of the load sensor system based on the at least one correlation coefficient over a predetermined time period; and
implementing, via the controller, a control action based on the operability of the load sensor system during operation of the wind turbine, the control action comprising at least one of adjusting a parameter of one or more components of the wind turbine or shutting down the wind turbine.

12. The method of claim 11, further comprising automatically checking the at least one correlation coefficient upon installation at a scheduled interval of time.

13. The method of claim 11, wherein the at least one correlation coefficient comprises at least one of an initial gain, an offset, or an R2 value.

14. The method of claim 11, further comprising determining a sensor location of each of the plurality of installed load sensors and providing the sensor locations to the computer model of the controller.

15. The method of claim 14, further comprising determining the estimated loading of the wind turbine based on the plurality of sensor signals, the turbine geometry, the plurality of additional input parameters, and the plurality of sensor locations.

16. The method of claim 15, further comprising determining a sensor orientation of each of the plurality of installed load sensors and providing the sensor orientations to the computer model of the controller.

17. The method of claim 16, further comprising determining the estimated loading the wind turbine based on the plurality of sensor signals, the turbine geometry, the plurality of additional input parameters, the plurality of sensor locations, and the sensor orientations.

18. The method of claim 11, wherein the plurality of installed load sensors further comprise at least one of strain gauges, proximity probes, tower top accelerometers, or pitch card accelerometers.

19. The method of claim 11, wherein the plurality of additional input parameters further comprise at least one of a yaw angle or turbine materials information.

* * * * *